United States Patent

[11] 3,602,069

| [72] | Inventors | Yoichi Mori;<br>Hirohisa Ichimura, both of Yokohama City, Japan |
|---|---|---|
| [21] | Appl. No. | 872,307 |
| [22] | Filed | Oct. 29, 1969 |
| [45] | Patented | Aug. 31, 1971 |
| [73] | Assignee | Nissan Motor Company, Limited<br>Yokohama, Japan |
| [32] | Priority | Oct. 30, 1968 |
| [33] | | Japan |
| [31] | | 43/78832 |

[54] LINE PRESSURE CONTROL SYSTEM FOR AUTOMOTIVE AUTOMATIC TRANSMISSION
7 Claims, 12 Drawing Figs.

[52] U.S. Cl. .................................................. 74/751,
74/752, 74/753, 74/731, 71/856
[51] Int. Cl. ................................................. F16h 5/40,
F16h 5/42, F16h 57/10
[50] Field of Search ......................................... 74/336,
365, 731, 752, 751, 866

[56] References Cited
UNITED STATES PATENTS

| 3,019,666 | 2/1962 | Brennan et al. | 74/866 |
| 3,122,940 | 3/1964 | Shimwell et al. | 74/866 |
| 3,267,762 | 8/1966 | Reval | 74/866 X |
| 3,416,393 | 12/1968 | Hattori | 74/731 |
| 3,420,328 | 1/1969 | Johnson et al. | 74/731 X |
| 3,433,101 | 3/1969 | Scholl et al. | 74/866 |
| 3,448,640 | 6/1969 | Nelson | 74/866 |

*Primary Examiner*—Arthur T. McKeon
*Attorney*—John Lezdey

ABSTRACT: A system for electronically controlling the hydraulic line pressure for an automatic transmission of an automotive vehicle which pressure changes in response to the variation of the twisting torque of the turbine shaft of a torque converter. This system generally comprises electric pickup means for picking up the twisting torque of the driven shaft and an electronic circuit for regulating the line pressure in response to the variation of the torque.

INVENTORS
YOICHI MORI AND HIROHISA ICHIMURA
BY
John Lezley
ATTORNEY

LINE PRESSURE CONTROL SYSTEM FOR AUTOMOTIVE AUTOMATIC TRANSMISSION

This invention relates to a system for electronically controlling line pressure in the hydraulic control circuit of an automatic transmission, and more particularly to a control system for regulating the line pressure in response of the torque of the turbine shaft of a torque converter.

In an automatic transmission, if an excessively high hydraulic control pressure is applied to the friction-engaging mechanism the mechanism is caused to engage abruptly to invite undue mechanical shocks while, if an excessively low pressure is applied the mechanism is coupled slowly to invite frictional heat.

The line pressure for controlling the hydraulic circuit must therefore be appropriate to effect the coupling of the friction engaging mechanism and it should preferably be proportional to the torque of the turbine shaft of the torque converter.

The present invention thus provides a novel and improved system for electronically controlling the line pressure in the hydraulic circuit of an automatic transmission in relation to the torque on the turbine shaft of a torque converter.

The features and advantages of the present invention will become apparent from the following description taken in conjunction with the accompanying drawings, in which:

Referring now to FIG. 1, the transmission comprises a drive shaft 10, driven shaft 11 and intermediate shaft 12. The drive shaft 10 may be the usual crankshaft of the vehicle engine, and the driven shaft 11 may be connected by any suitable means. The shafts 10, 11 and 12 are rotatably mounted with respect to the transmission housing (not shown) and the shaft 12 is driven with respect to the shafts 10 and 11. The transmission further comprises a hydraulic torque converter 13, hydraulically operated friction clutches 14 and 15, hydraulically operated friction brakes 16 and 17 and first and second planetary gear sets 18 and 18'.

Figure 1:
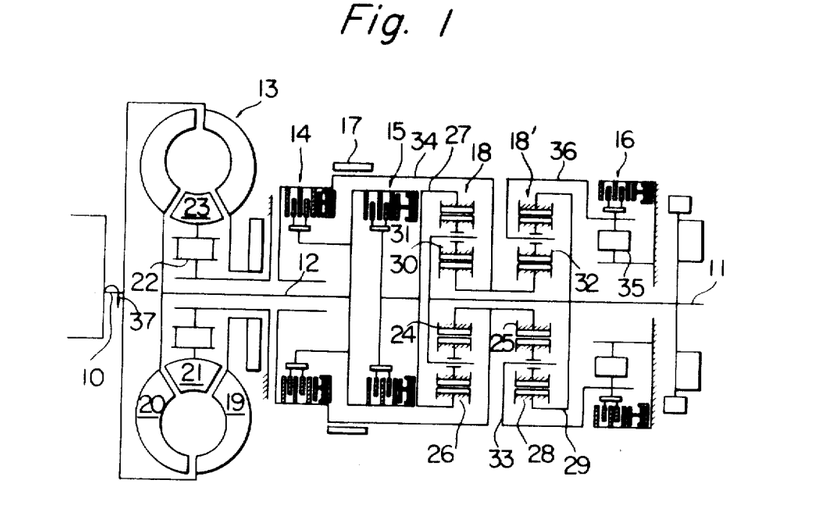
FIG. 1 is a diagrammatic view of an automotive transmission to which the system of the present invention is to be applied.

The hydraulic torque converter 13 comprises a vaned impeller element 19, vaned rotor or driven element 20 and a vaned stator or reaction element 21. The vaned elements 19, 20 and 21 are mounted within a fluidtight casing (now shown), part of which is formed by the casing (not shown) of the impeller 19. The impeller is driven from the drive shaft 10. The rotor 20 is rotatably mounted with respect to the transmission casing (not shown). A one-way brake 22 is provided between the stator 21 and the transmission casing (not shown). The one-way brake 22 may be of any suitable construction and is so arranged as to allow a free rotation of the stator 21 in the forward direction, that is, in the direction in which the drive shaft 10 rotates and prevents the rotation of the stator 21 in the reverse direction. T The torque converter 13 operates in a manner well known and it drives the rotor or driven element 20 at a torque greater than the torque impressed on the impeller 19 of the converter by the engine. The vanes of the stator 21 serve to change the direction of flow of fluid between the rotor and impeller. Here, the reaction on the stator 21 takes place in the direction reverse to the rotation of the drive shaft 10, so that the one-way brake 22 prevents the rotation of the stator 21 in this direction. When the speed of the driven element or rotor 20 reaches a predetermined level, the direction of the reaction on the vanes of the stator 21 is altered so that the stator 21 tends to turn in the forward direction. The brake 22 acts to allow such rotation of the stator 21, in which instance the torque converter 13 functions as a simple fluid coupling to drive the rotor 20 at substantially the same speed and without increase in torque.

The first and second planetary gear sets 18 and 18', respectively, comprise a first sun gear 24 formed on the driven shaft 11, a second sun gear 25 integral with the sun gear 24, a ring gear 26 formed on a bell-shaped portion 27 connected through the clutch 15 with the intermediate shaft 12, a second ring gear 28 formed on a bell-shaped portion 29 of the driven shaft 11, a plurality of a planet gears 30 each of which is rotatably mounted in the planet gear carrier 31 connected to the driven shaft 11, a plurality of second planet gears 32 each of which is rotatably disposed in the planet gear carrier 33 which is connected through the brake 16 to the transmission housing (not shown). The planet gears 30 are in mesh with the sun gear 24 and with the ring gear 26. The planet gears 32 are in mesh with the sun gear 25 and with the ring gear 28.

The transmission also comprises a connecting drum 34 which is connected at its rear end to the sun gears 24 and 25 and at the front end through the clutch 14 to the intermediate shaft 12. A one-way brake 35 is disposed between a bell-shaped portion 36 connected to the carrier 33 and the transmission housing.

The clutch or front clutch 14 is arranged to connect the intermediate or turbine shaft 12 driven by the rotor 20 through the connecting drum 34 with the sun gears 24 and 25 formed on the driven shaft 11.

The clutch or rear clutch 15 is so arranged as to connect the intermediate shaft 12 and rotor 20 with the ring gear 26 of the first planetary gear set 18. The low-and-reverse brake 16 is arranged to connect the carrier 33 through the bell-shaped portion 36 with the transmission housing. The brake 17 is adapted to brake the connecting drum 34. The one-way brake 35 may be of any suitable construction and is so arranged as to allow a free rotation of the carrier 33 connected with the bell-shaped portion 36 in the forward direction, that is, in the direction in which the drive shaft 10 rotates and to prevent the rotation of the carrier 33 in the reverse direction.

In operation, the transmission has a neutral condition and provides low, intermediate and high-speed ratios in forward drive and a drive in reverse. As indicated in the following Table I, when the transmission is in the neutral condition, the front and rear clutches 14 and 15, brake 17, low-and-reverse brake 16, and one-way brake 35 are all disengaged. The low speed ratio power train is completed by engaging the rear clutch 15 and the low-and-reverse brake 16, in which instance the reduction ratio $R_1$ is equal to 2.46. The low-speed ratio in a drive range is completed by engaging the rear clutch 15 and one-way brake 35, i5 instance the reduction ratio $R_1$ is invariably equal to 2.46. The intermediate speed ratio in the drive range is completed by engaging the rear clutch 15 and brake 17, when the reduction ratio $R_2$ is equal to 1.46. The high-speed ratio in the drive range is completed by engaging the front and rear clutches 14 and 15, when the reduction ratio $R_3$ is equal to 1.00. The reverse speed ratio is completed by engaging the front clutch 14 and low-and-reverse brake 16, when the reduction ratio $R_{rev}$ is equal TO 2.18.

TABLE I

| Shifting a | Front clutch | Rear clutch | Second brake | Low and reverse brake | One-way brake | Reduction ratio |
|---|---|---|---|---|---|---|
| | − | O | − | O | − | $R_1 = 2.46$ |
| | − | O | − | − | * | $R_1 = 2.46$ |
| | − | O | O | − | − | $R_2 = 1.46$ |
| | O | O | − | − | − | $R_3 = 1.00$ |
| | O | − | − | O | − | $R_{rev} = 2.18$ |

Symbol "O" indicates that the friction elements are actuated hydraulic pressure; "*" that the elements are actuated ontaneously by the reaction; "I" a condition in which the gine braking can be applied in a low-speed range; "D1, D2, 3" the first or low speed, the second or intermediate speed d the third or high-speed ratio in the drive range; and "R" e drive in reverse.

When the vehicle is started at the first speed range ratio, ere takes place a slip between the impeller 19 and rotor 20 the torque converter 13, and the rotor 20 is driven with rque greater than the torque on the impeller 19 so that both e hydraulic torque converter 13 and the planetary gear sets 3 and 18', which are connected in series, multiply the torque :tween the drive shaft 10 and driven shaft 11. Under these onditions,, the one-way brake 22 acts to hold the stator 21 at :st. The hydraulic torque converter 13 permits the vehicle to art gradually. The vehicle being thus started, the driven element 20 of the converter 13 is rotating at a certain speed. The ne-way brake 22 is released and the stator 21 starts to rotate the forward direction. The converter 13 now acts as a simple fluid coupling to provide no increase in the torque. In this w-speed range, the transmission cannot be shifted to a igher speed range but it is fixed at only the low-speed ratio.

In the drive range, when the vehicle is started, it is also automatically shifted to a higher speed ratio at a predetermined ehicle speed as will be described hereinafter. The only difference between the low-speed ratios in the low and drive anges is that the low-speed forward drive through the transmission in low range is at all times available but is effected ither when a greater torque is required to drive the vehicle or or engine-braking purposes. The low-speed forward drive nrough the transmission in drive range, on the other, is intended to automatically control the shifting of the speed ratio, n which instance the one-way brake 35 acts to hold the carrier 33 of the second planetary gear set 18' at rest to produce a eaction torque. Thus, the reduction ratio $R_1$ which is equal to .46 is established between the intermediate shaft speed and he output.

The intermediate speed ratio power train through the transmission is built up by engaging the rear clutch 15 and brake 7. The brake 17 serves to hold the connecting drum 34 stationary and the one-way brake 35 is released to rotate freely. The sum of the torque transmitted from the engine through he torque converter 13, intermediate shaft 12 and rear clutch 5 to the ring gear 26 of the first planetary gear set 18 and the eaction torque produced at the brake 17 is transmitted to the output shaft 11. Thus, the reduction ratio $R_2$ of 1.46 is established between the intermediate shaft speed and output peed.

The high-speed ratio power train through the transmission, vhich constitutes a direct drive between the drive shaft 10 and lriven shaft 11, is built up by engaging the front and rear :lutches 14 and 15, respectively, allowing the brake 17 to be eleased. In this conditions, the intermediate shaft 12 is connected through the front clutch 14 and sun gears 24 and 25 to he output shaft 11, in which instance the reduction ratio R equal to 1.00 is established between the intermediate and output shaft speed.

The low or first range speed ratio power train through the transmission is built by engaging the rear clutch 15 and low- and-reverse brake 16, allowing the brake 17 to be released. The low-and-reverse -reverse brake 16 serves to produce a reaction torque, the sum of which torque and the torque transmitted to the ring gear 26 of the first planetary gear set 18 is transmitted to the output shaft 11 of the vehicle.

Reverse drive is built up in the transmission by engaging the front clutch 14 and low-and-reverse brake 16, respectively. For this drive, the power train is transferred from the drive shaft 10 through the torque converter 13 to the intermediate shaft 12 and thence through the front clutch 14 to the sun gear 25 of the second planetary gear set 18'. On the other hand, the low-and-reverse brake 16 produces reaction torque in the reverse direction. Thus, the difference between the torque transmitted to the sun gear 25 of the second planetary gear set 18' and the reaction torque produced at the low-and-reverse brake 16 is transmitted to the output shaft 11 of the vehicle. In this reverse drive, the reduction ratio is 2.18.

Figure 2:
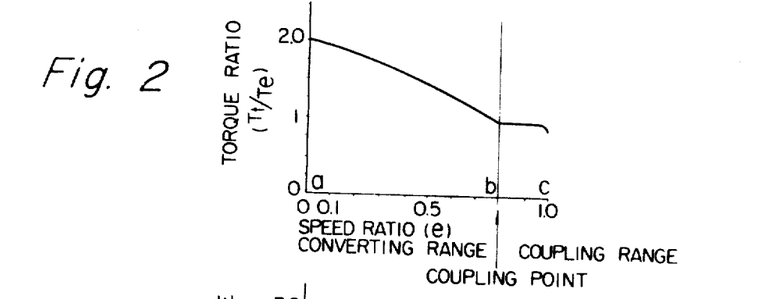
FIGS. 2 to 7 are graphical representations of the relationship between the torque ratio vs. speed ratio; turbine torque vs. turbine speed; line pressure vs. speed ratio; line pressure vs. turbine speed; turbine torque vs. turbine speed in another condition; and output shaft torque vs. output shaft speed in the first, second, third speeds, respectively.

Reference is also made to FIGS. 2, 3, 4, and 5. In the power train of automotive engine, the torque $T_e$ produced at the engine is increased by the torque converter to $T_t$, which is equal to the product of the torque ratio $t$ and engine torque. This increased torque $T_t$ is transmitted through the output of the torque converter or turbine shaft to the clutch 14 or 15. The torque is further increased at the planetary gear sets so as to multiply the reduction ratio R. The torque transmitted to the output shaft of the vehicle is thus equal to $T_o$, which, in turn, is equal to the product of the reduction ratio R and the torque $T_t$ at the turbine shaft. In this instance the torque ratio $t$ varies according to the change of the speed ratio $e$ of the torque converter as illustrated in FIG. 2, in which when the speed ratio $e$ is equal to zero the torque ratio is approximately 2 as indicated at point $a$. As the ratio $e$ increases to 0.8, the ratio $t$ becomes approximately 1 as indicated at point $b$. The ratio $t$ is kept unchanged and is maintained at 1 as denoted, when the ratio $e$ increases beyond the point $b$. As the ratio $e$ approaches 1, the ratio $t$ abruptly falls down as indicated at point $c$ Thus, the range from zero to the coupling point of the speed ratio ($a$–$b$) is usually named a conversion range and the range from the coupling point to 1 ($a$–$c$) named a coupling range.

Since the curve of the torque ratio vs. speed ratio is generally straight as observed in FIG. 2, it may be accepted to deem the curve as a perfect straight line for all practical purposes of controlling the automatic transmission.

It is noted that the hydraulic pressure or line pressure in the control circuit of the transmission should vary in proportion to the change in the turbine torque $T_t$, or more precisely, to the product of the engine torque $T_e$ and torque ratio $t$. This is exemplified in FIG. 3.

Figure 3:
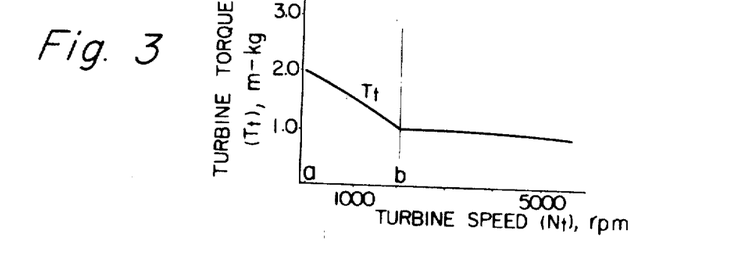
Figure 4:
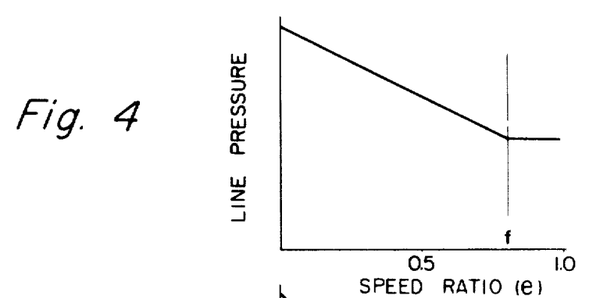
Figure 5:
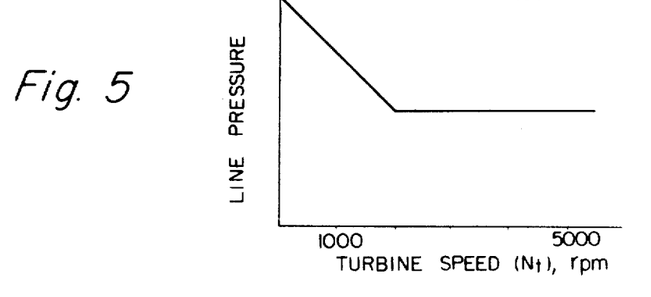
Figure 6:
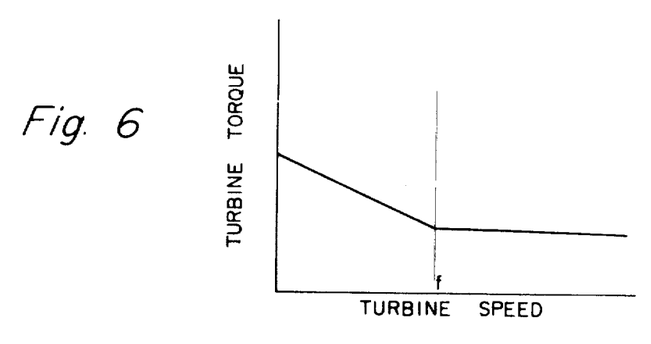

Reference to FIG. 3, the point $f$ of the turbine shaft speed stands for the coupling point corresponding to point $b$ in FIG. 2. The point $f$ is a constant which is determined by the position of the throttle valve of the engine. The point $f$ may be, for instance, three-fourth as seen in FIG. 3. In FIG. 3, the curve is shown to have a characteristics that, if the speed $N_t$ is zero, the torque $T_t$ is approximately 2.0. As the speed $N_t$ increases, the torque $T_t$ continues to decrease until the speed $N_t$ reaches the coupling point, which is, for example, approximately 2,000 r.p.m. Even though the speed $N_t$ further increases beyond the coupling point, the torque $T_t$ is kept constant up to maximum turbine speed. The curve of FIG. 3 may well be deemed as a straight line as shown in FIG. 6.

Figure 7:
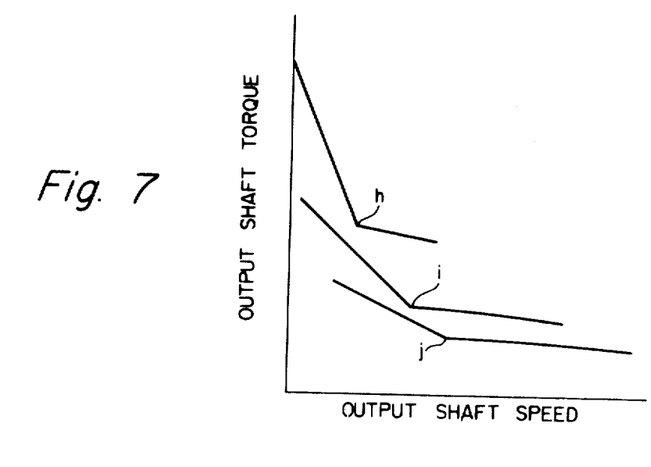

FIG. 7 illustrates the relationships between the output shaft torque and speed at the first, second and third speeds when the throttle valve is held in a fixed position. Here, the individual curves stand for different reduction ratio. The reduction ratio in the first speed as indicated by the curve $h$ is higher than those in the second and third speeds indicated by the curves $i$ and $j$ respectively.

It is noted that the hydraulic pressure or line pressure in the control circuit of the transmission should vary in proportion to the change in the turbine torque $T_t$, or more precisely, to the product of the engine torque $T_e$ and torque ratio $r$. This is exemplified in FIG. 3.

Reference to FIG. 3, the point $f$ of the turbine shaft speed stands for the coupling point corresponding to point $b$ in FIG. 2. The point $f$ is a constant which is determined by the position of the throttle valve of the engine. The point $f$ may be, for instance, three-fourth as seen in FIG. 3. In FIG. 3, the curve is shown to have a characteristics that, if the speed $N_t$ is zero, the torque $T_t$ is approximately 2.0. As the speed $N_t$ increases, the torque $T_t$ continues to decrease until the speed $N_t$ reaches the coupling point, which is, for example, approximately 2,000 r.p.m. Even though the speed $N_t$ further increases beyond the coupling point, the torque $T_t$ is kept constant up to maximum turbine speed. The curve of FIG. 3 may well be deemed as a straight line as shown in FIG. 6.

FIG. 7 illustrates the relationships between the output shaft torque and speed at the first, second and third speeds when the throttle valve is held in a fixed position. Here, the individual curves stand for different reduction ratio. The reduction ratio in the first speed as indicated by the curve $h$ is higher than those in the second and third speeds indicated by the curves $i$ and $j$, respectively.

Figure 8:
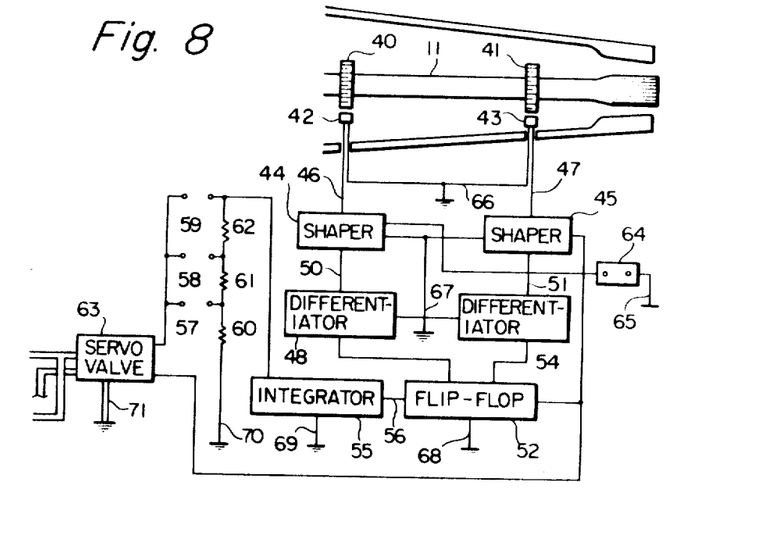
FIG. 8 is a block diagram of the electronic control system according to the present invention.

FIG. 8 illustrates a block diagram of the electronic line pressure control system according to one embodiment of the present invention. The system as shown consists largely of two disc plates 40 and 41 mounted a certain distance apart on the driven shaft 11 and each including a plurality of projections on the circumferential periphery thereof and rotating integrally with the driven shaft. Two electromagnetic pickup means 42 and 43 are provided each located adjacent to a predetermined point on the periphery of the respective disc plates 40 and 41 and arranged to generate an AC voltage of the same phase. Two wave-shaping means 44 and 45 are connected with the pickup means 42 and 43, respectively, through respective lines 46 and 47. Two differentiating means 48 and 49 are provided for differentiating the output voltage of the respective wave-shaping means 44 and 45, respectively. The means 48 and 49 are connected through lines 50 and 51 to the means 44 and 45, respectively. A flip-flop means 52 is connected through lines 53 and 54 to the differentiators 48 and 49, respectively. The flip-flop means 52 generates a square wave rising at one pulse from one of the differentiating means 48 and 49 and falling at the other pulse from the other of the differentiating means 48 and 49 and a square wave having a duration proportional to the phase difference between the outputs generated at the respective pickup means 42 and 43. An integrating means 55 is connected with the flip-flop means 52 through an electric line 56 to integrate the output square wave from the flip-flop means 52 so as to produce a DC voltage proportional to the duration of the square wave. A plurality of electrical switches 57, 58 and 59 with a plurality of corresponding resistor elements 60, 61 and 62 dividing a voltage to provide a voltage corresponding to the speed range of the vehicle for opening or closing the circuit from the integrating means 55. A servo valve means 63 is provided for regulating the line pressure responsive to the electrical output from the voltage divider. Designated at 64 is a source of electric power.

The wave-shaping means 44 and 45 may be Schmitt circuits. The arrangement of the switches 57, 58 and 59, and resistor elements 60, 61 and 62 is for the first or low, second or intermediate and third or high-speed ratios is such that the output is divided by the resistor elements 60 for the first speed, 60 and 61 for the second, and 60, 61 and 62 for the third. This system also includes grounded lines 64 to 71 connected to the source 64, pickup means 42 and 43, shapers 44 and 45, differentiators 48 and 49, flip-flop 52, integrator 55, resistor elements 60 to 62, and servo valve means 63, respectively.

The aforementioned circuit arrangement regulates the line pressure in relation to the torque of the turbine shaft of the torque converter.

Figure 9:
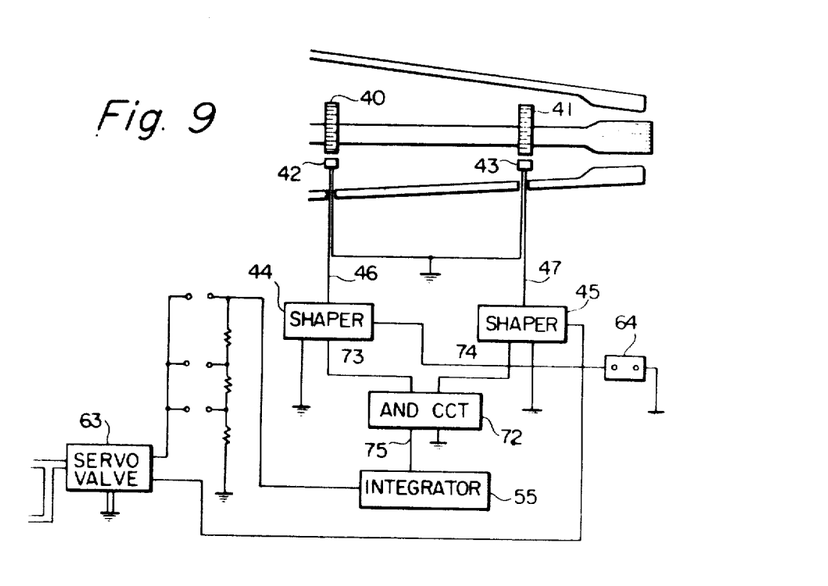
FIG. 9 is similar to FIG. 8 but showing a modification of the system shown in FIG. 8.

A modified form of the embodiment shown in FIG. 8 is illustrated in FIG. 9. This modified system is constructed and arranged essentially similarly to the system shown in FIG. 8 except in that an AND circuit means 72 is used for generating a square wave having the duration corresponding to that of the square waves produced at the shapers 44 and 45. The AND circuit is connected with the shapers 44 and 45 through respective lines 73 and 74. The integrating means 55 is connected to the AND circuit 72 through a line 75 to integrate the output square wave from the AND circuit 72 to produce a DC voltage proportional to the duration of the square wave.

In operation, when a twisting torque is absent at the driven shaft of the torque converter the output voltages produced from the shapers 44 and 45, respectively are each 180 degrees out of phase to each other with the result that there is no voltage produced out of the AND circuit 72. On the other hand, if a torque is present at the driven shaft 11, both square waves have an superimposed duration thereof proportional to the torque produced at the driven shaft 11. This superimposed portion of both waves enables the AND circuit 72 to produce a square wave having the duration proportional to the superimposed portion. This output voltage is applied through the line 75 to the integrator 55 to produce a DC voltage proportional to the duration of the voltage out of the AND circuit. The output of the integrator 55 is applied through the switch means and resistor elements to the servo valve means 63 to regulate the line pressure in the hydraulic control system for the automatic transmission.

Figure 10:
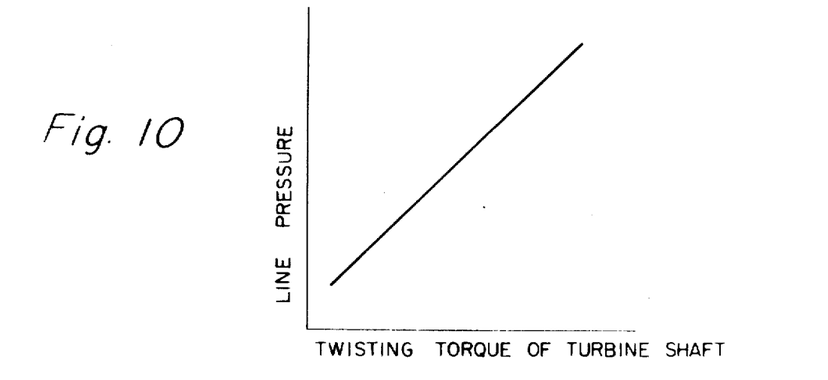
FIG 10 is a graphical representation of the relationship between the line pressure and the twisting torque of the turbine shaft of the torque converter.

FIG. 10 shows the relationship between the line pressure and twisting torque of the turbine shaft of the torque converter.

Figure 11:
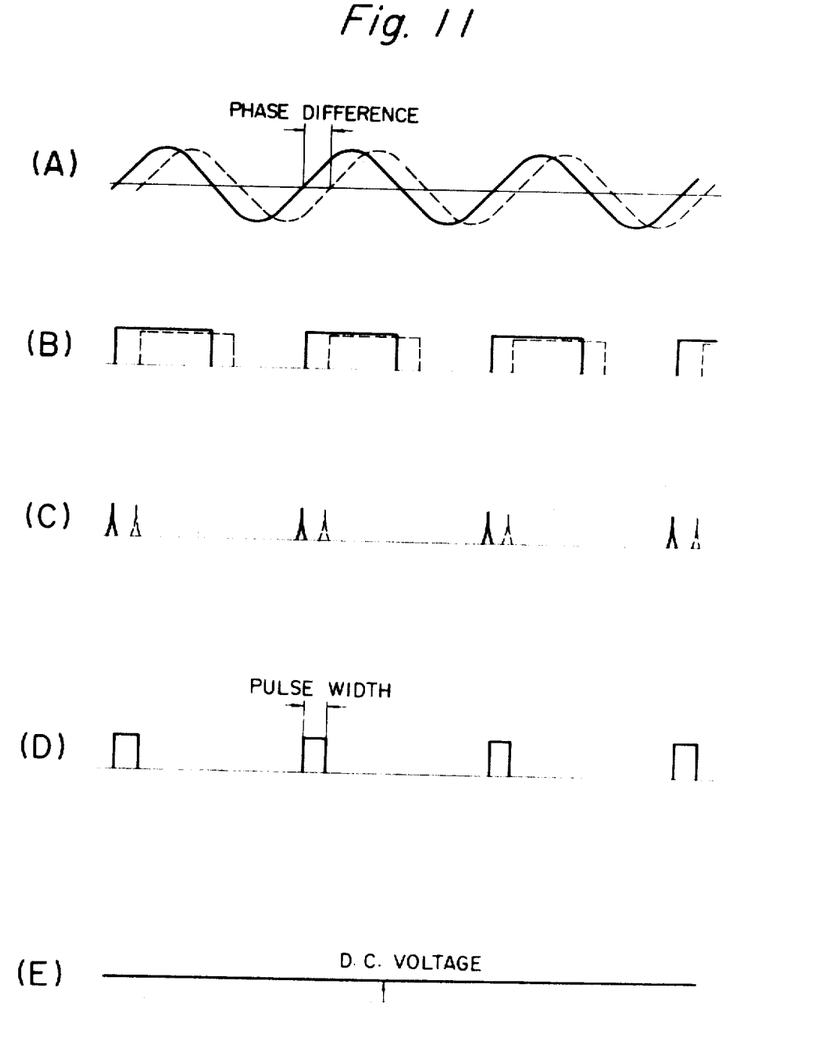
FIG. 11 is a graphical illustration of several electric wave forms of electric currents appearing at different elements in the circuit shown in FIG. 8, such as the alternating currents derived from the pickup means (a); the square wave derived from the shapers (b); the output from the differentiators (C); and the square wave derived from the flip-flop (D): ; the direct-current voltage derived from the integrator (E)

Referring now to FIG. 11, there are shown different waveforms appearing at the different elements of the system shown in FIG. 8. In FIG. 11, (A) indicates the AC waves derived from the pickup means 42 and 43, (B) the square waves from the shapers 44 and 45, (C) the waves from the differentiators 48 and 49, (D) the square wave from the flip-flop 52, and (E) the DC voltage from the integrator 55.

Figure 12:
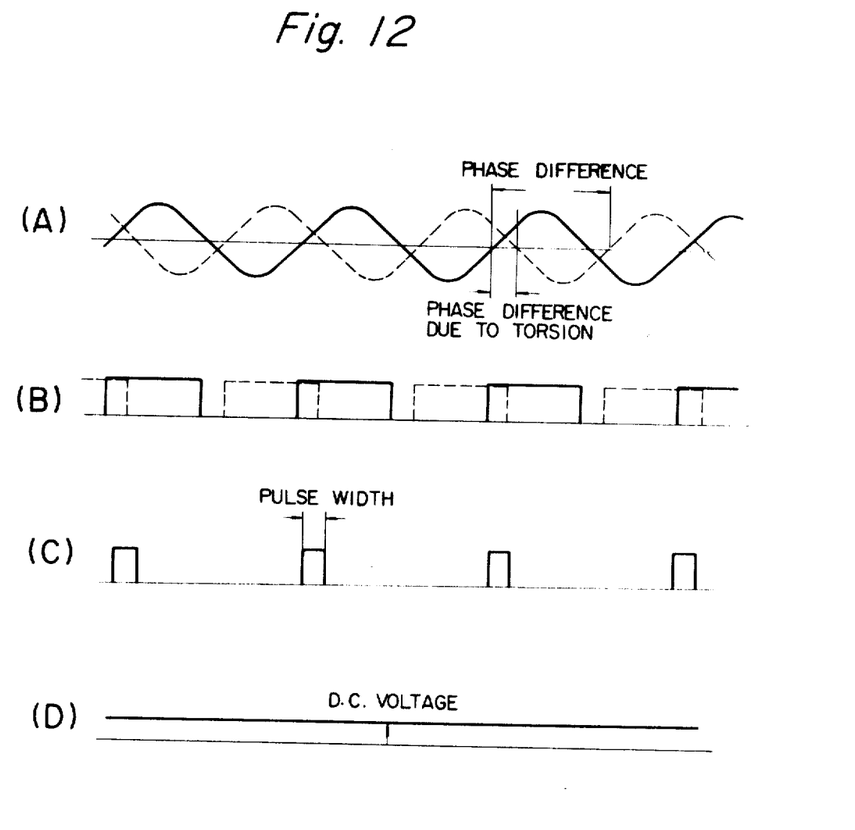
FIG. 12 is similar to FIG. 11 but corresponds to the system of FIG. 9.

FIG. 12 is a counterpart of FIG. 11 obtained in connection with the system shown in FIG. 9. In FIG. 11, the waveforms (A), (B) and (D) corresponds to their counterparts of FIG. 10 and the waveform of (C) is the wave derived from the AND circuit 72.

It is to be understood from the foregoing description that the line or fluid pressure is regulated in response to the torque of the turbine shaft of the torque converter by picking up the voltage corresponding to the twisting torque produced at the driven shaft.

It is also clear that the power loss in the oil pump is eliminated by keeping the line pressure within reasonable limits in the hydraulic control circuit of the transmission mechanism.

It is also an advantage of the disclosed system that there is no need for the conventional governor as the electric vehicle speed signal is picked up by means of the present system.

We claim:

1. In an automatic transmission driven by an engine of an automotive vehicle and including friction elements for changing speed ratios of the vehicle when actuated, a hydraulic control system in which fluid having a line pressure is flowing for selectively actuating the friction elements, and an output shaft for applying a driving force to the vehicle, an electronic control system for electronically controlling a pressure level of said line pressure approximately in dependence upon torque transmitted from the engine to the transmission, said electronic control system comprising:

a pair of torque-detecting means detecting torque of said output shaft in terms of torsion between two spaced portions on said output shaft for generating two AC voltage waves respectively representative of rotation characteristics of said two spaced portions;

a pair of phase-difference-detecting means respectively connected with said torque-detecting means for generating a square wave having a width proportional to the phase difference due to said torsion;

integrating means connected with said phase-difference-detecting means for integrating said square wave into a DC voltage having a magnitude proportional to the width of said square wave;

at least one voltage dividing means connected with said integrating means for dividing said DC voltage into DC voltages respectively corresponding to one of said speed ratios at which said vehicle is running;

electrohydraulic converting means for converting a voltage applied thereto into the pressure level of said line pressure in dependence upon a magnitude of said voltage; and at least one switch means for interconnecting said electrohydraulic converting means with one of said voltage dividing means and applying to said electrohydraulic converting means one of said DC voltages corresponding to said one speed ratio at which said vehicle is running.

2. An electronic control system according to claim 1, wherein said torque-detecting means include:

a pair of disc plates fixedly mounted on said two spaced portions of said output shaft and respectively having a plurality of projections on the circumferential periphery thereof for developing two magnetic fields respectively varying with rotations of said disc plates, and a pair of magnetic-electric converting means disposed adjacent to the corresponding projections of said disc plates for respectively converting said two magnetic fields into said two AC voltage waves.

3. An electronic control system according to claim 2, wherein said projections are arranged in such a manner that said magneto-electric converting means generate said two AC voltage waves which are in phase.

4. An electronic control system according to claim 3, wherein said phase-difference-detecting means include:

a pair of wave-shaping means respectively connected with said magneto-electric converting means for respectively shaping said two AC voltage waves into corresponding square voltage waves respectively having a width proportional to a half period of said two AC voltage waves;

a pair of differentiating means respectively connected with said wave-shaping means for respectively differentiating said square voltage waves into corresponding single pulses; and flip-flop means connected with said differentiating means for generating a square voltage wave having a width proportional to time difference between said single pulses.

5. An electronic control system according to claim 2, wherein said projections are arranged in such a manner that said magneto-electric converting means generate said two AC voltage waves which are in phase opposition.

6. An electronic control system according to claim 5, wherein said phase difference detecting means include:

a pair of wave-shaping means respectively connected with said magneto-electric converting means for respectively shaping said two AC voltage waves into corresponding square voltage waves respectively having a width proportional to a half period of said two AC voltage waves; and AND circuit means connected with said wave-shaping means for generating a square voltage wave having a width proportional to superimposed duration time of the square voltage waves of said wave-shaping means.

7. An electronic control system according to claim 1, wherein said electrohydraulic converting means includes:

a servo valve connected with said switch means for controlling the pressure level of said line pressure when energized.